United States Patent [19]

Bergkvist

[11] Patent Number: 4,589,841
[45] Date of Patent: May 20, 1986

[54] CAP FOR NOZZLES IN AN AFTER COMBUSTION FLUIDIZED BED

[75] Inventor: Jörgen Bergkvist, Finspong, Sweden
[73] Assignee: Asea Stal AB, Västerås, Sweden
[21] Appl. No.: 787,715
[22] Filed: Oct. 17, 1985

Related U.S. Application Data

[63] Continuation-in-part of Ser. No. 606,146, May 2, 1984, abandoned.

[51] Int. Cl.⁴ .............................................. F23D 19/00
[52] U.S. Cl. ...................................... 431/170; 431/7; 422/142; 122/4 D
[58] Field of Search ........................... 431/7, 170, 328; 122/4 D; 34/57 A, 57 R; 110/245; 165/104.16; 422/142, 139, 141; 432/58, 14

[56] References Cited

U.S. PATENT DOCUMENTS

| | | | |
|---|---|---|---|
| 3,494,046 | 2/1970 | Harkreader | 34/57 A X |
| 3,881,857 | 5/1975 | Hoy | 431/7 |
| 4,135,885 | 1/1979 | Wormser et al. | 422/142 |
| 4,303,023 | 12/1981 | Perkins et al. | 122/4 D X |
| 4,321,233 | 3/1982 | Tsuji | 431/7 X |
| 4,445,844 | 5/1984 | Matthews | 431/170 |
| 4,460,330 | 7/1984 | Asai et al. | 431/170 |

FOREIGN PATENT DOCUMENTS

| | | | |
|---|---|---|---|
| 1259787 | 3/1961 | France | 122/4 D |
| 1425704 | 2/1976 | United Kingdom | 431/7 |
| 1431763 | 4/1976 | United Kingdom | 122/4 D |
| 288891 | 8/1971 | U.S.S.R. | 34/57 A |

Primary Examiner—Margaret A. Focarino
Attorney, Agent, or Firm—Watson, Cole, Grindle & Watson

[57] ABSTRACT

A nozzle cap for a gas inlet fluidizing nozzle in the bottom plate of a post-combustion bed in a hot water or steam boiler with at least two fluidized beds is provided. Flue gases from an underlying combustion bed enter the post-combustion bed via a plurality of such gas inlet nozzles. Each nozzle cap is formed as a deflecting member for guiding the flue gases to the bed material and is shaped to minimize the risk of clogging of the cap with particles entrained in the flue gases and the risk of the cap being eroded by the fastly moving particles.

3 Claims, 5 Drawing Figures

CAP FOR NOZZLES IN AN AFTER COMBUSTION FLUIDIZED BED

This application is a continuation-in-part, of application Ser. No. 606,146, filed May 2, 1984, now abandoned.

BACKGROUND OF THE INVENTION

1. Field of the Invention

This invention relates to a cap for a gas-supply nozzle in a post-combustion bed in a hot water or steam boiler having at least two fluidizing beds, in which the flue gases from an upstream combustion bed enter a subsequent or downstream combustion bed which is provided with a number of nozzles and in which a nozzle cap is provided over each nozzle to serve as a deflecting member for guiding the flue gases into the bed material forming the post-combustion bed.

U.S. patent application Ser. No. 584,511 filed on Feb. 28, 1984, in the name of Erik Henriksson and assigned to the assignee of this application describes a method for cleaning the gas-supply nozzles in a hot water or steam boiler with two or more fluidizing beds, where at least in the bed immediately downstream of the most upstream bed (the combustion bed) surges of gas under pressure are supplied to the nozzles or the hole openings to keep the latter clear of blocking deposits. By raising the pressure of air or other gas supplied to the nozzles instantaneously, the nozzles in the post-combustion bed, through which the gases of combustion from the combustion bed flow to the upper bed, are periodically cleared of impurity deposits which, if not removed, will block the nozzles and occasion shut down of the boiler.

The above-mentioned patent application also describes a hot water or steam boiler having at least two fluidizing beds.

2. Description of the Prior Art

Problems arise in connection with the nozzles. In spite of the abovementioned supply of air, on the one hand there is a risk of clogging of a deflecting member mounted above the nozzle since the air or gas flowing through the nozzle is mixed with dust, and on the other hand there is a need to cool any such deflecting member.

It is also desirable to prevent back-flow of the bed material from the post-combustion bed back down to the lower combustion bed, to make any deflecting member used relatively insensitive to erosion, to avoid narrow passages in the bed and to obtain a good mixing of flue gas and air. Furthermore, it is desirable to improve the fluidization by reducing the pressure drop across the bed as a function of the bed height, which is important particularly in the case where the plant is operated with only a partial load on the boiler.

SUMMARY OF THE INVENTION

The invention relates to a nozzle cap of the aforedescribed type which cap functions as a deflecting member and by which the abovementioned problems are solved. The invention is characterized in that each nozzle cap is formed to provide a deflecting member for guiding the flue gases laterally into the particulate bed material.

Conveniently the gas inlet nozzle is an injection tube and the nozzle cap is a roof placed over the open end of the tube, thus providing a space between the injection tube and the cap, this space being traversed by the flue gases and having such a volume that a gas cushion is formed between said cap and the open end of the injection tube. In this way, a deflection of the gas flow is obtained and back-flow of bed material to an underlying bed is prevented. Clogging of the cap can be avoided by suitable shaping of the cap and cooling of the cap is obtained via the external contact of the cap with the particulate fluidizing bed material.

BRIEF DESCRIPTION OF THE DRAWING

The invention will now be further described, by way of example, with reference to the accompanying drawing, in which.

DESCRIPTION OF THE PREFERRED EMBODIMENT

Figure 1:
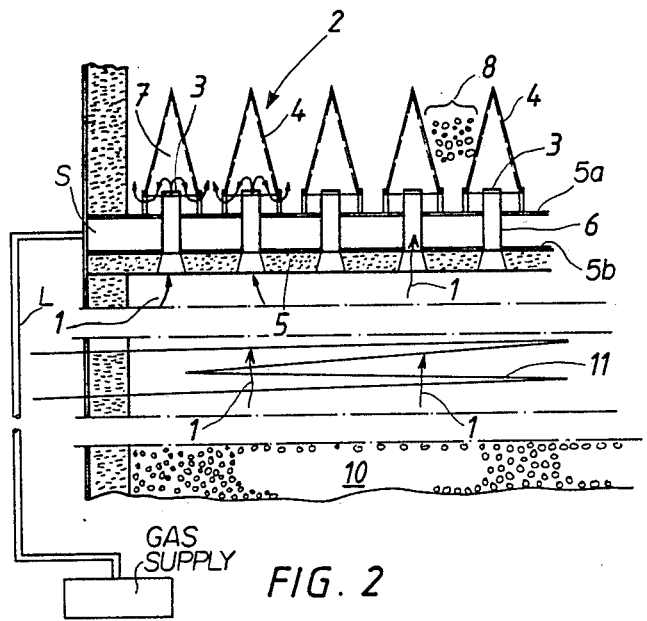
FIG. 1 shows a number of nozzles in part of the bottom of a fluidized bed with a nozzle cap on each nozzle.

FIG. 1 shows part of a so-called MBC boiler with the lowermost bed 10 shown only schematically and the next upper bed 2 shown only in part. The flue gases 1 which leave the bed 10 (the combustion bed) pass heat to a heat exchange system 11 and then flow upwardly into the post-combustion bed 2 where residual calorific energy is extracted in a second stage of combustion. The bed material 8 of the post-combustion bed 2 is shown only schematically in FIG. 1, but in practice it would be fluidized above a floor 5 of the second bed by the flue gas (admixed with air) which are fed upwardly through injection tubes 6 extending through floor 5.

The floor includes a pair of spaced apart plates 5a, 5b defining a plenum space 5 therebetween. Tubes 6 extend through these plates and the upper ends 3 thereof define nozzles. Each of the tubes 6 has at least one small hole 6a in the wall thereof through which plenum space 5 is in communication with the flue gas passing through the tubes. Surges of air or gas under pressure is supplied from a Gas Supply through a line L to plenum space 5 for intermittently admixing with the flue gas passing through the tubes so as to periodically clear nozzles 3 of any impurity deposits which could block the flow of flue gases therethrough. The Gas Supply may include an air compressor, air accumulator, valving, etc. similar to that disclosed in the related U.S. Ser. No. 584,511. Such disclosure is therefore specifically incorporated herein by reference.

The upper end 3 of each nozzle 6 is covered with a cap 4 and these caps serve a number of important functions as will hereafter be set out. The invention concerns the design of these nozzle caps.

Although only one post-combustion bed 2 has been shown in FIG. 1, it should be appreciated that further post-combustion beds could be provided above the bed 2 and that similar bed-bottom constructions to that shown in FIGS. 1 and 2 may be required on these later post-combustion beds.

As already stated, the invention relates to the nozzle caps 4, which are mounted on the upper plate 5a of the bed 2 over each nozzle 6. The nominal operating temperature in the bed 2 may be, for example, 850° C. Each nozzle cap 4 deflects the flue gas 1, mixed with dust, and having a temperature of about 950° C., sideways into the mass of bed material 8. The dust entrained with the flue gas 1 contains, among other things, "burning" coal—pyrite—and/or coke particles having a temperature of 600°–1200° C., as well as glowing and partially melted ash particles. If desulfurizing with limestone is being employed, a microdust is formed which has great adhesivity in conventional nozzles, resulting in a risk of these clogging.

In the post-combustion bed shown in FIG. 1, the flue gas enters the bed 2 via the nozzles or injection tubes 6 in the floor 5, these nozzles/injection tubes being disposed substantially vertically. Between the end 3 of each nozzle/injection tube 6 and its overlying cap hood 4, a space 7 is defined, this space being traversed by the flue gases. The space 7 below the cap 4 defines a volume that allows a gas cushion to form above the end opening 3 of each inlet nozzle 6. The cap 4 may have the shape of a cone or a pyramid with polygonal section (e.g. square or rectangular). The cone or pyramid may be truncated. The semi-angle of the conical or pyramidal cap may suitably be between 10° and 30°. The space 7 above the end 3 of each injection tube 6 is shaped so that there is a low risk of it becoming clogged with particles entrained in the gases flowing into it through the tube 6. Further, because the walls of the cap 4 are steeply inclined with respect to the axis of the tube 6 the abrasive action of the flue gases on the cap 4 is reduced to acceptable levels. Thus, the inclination of the outer wall(s) of each cap relative to the center line of the nozzle 6 it overlies should be selected so that the tendency of particles in the flue gases or the particles of bed material to adhere to the wall(s) of the cap 4 is as low as possible.

Figure 2:
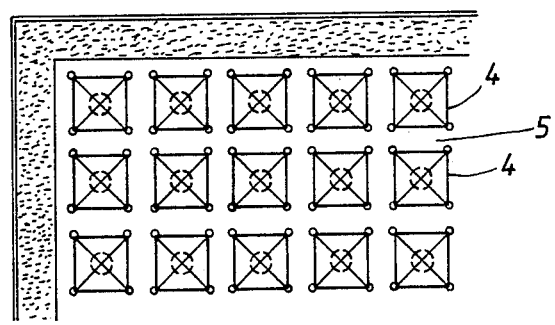
FIG. 2 shows the bed part of FIG. 1 seen from above.

FIG. 2 shows a number of caps 4 arranged over the bottom plate 5 of the bed 2. The function/operation of each nozzle cap can be summarized as follows:

1. It serves to deflect the gas flow through the underlying nozzle laterally into the bed material (see the arrows in the two left-hand caps 4 in FIG. 1).
2. It acts to prevent back-flow of bed material 8 down through the nozzle 6 to the underlying bed, while remaining insensitive to clogging or adherence of dust internally, since the shape of the cap holds a floating dust-gas cushion within the apex of the cap which serves as a buffer to deflect the incoming gas.
3. Its physical shape prevents excessive temperature rise in the wall(s) of the cap due to the latter being cooled by virtue of the fluidization of the bed 2 outside it. The wall(s) thus assume a temperature equivalent to that of the particles 8 in the bed 2, i.e. a temperature of approximately 850° C., whereas the temperature on the inside of the cap 4 (i.e. gas and/or burning particles) may be significantly higher.
4. It has low sensitivity to erosion due to the favorable angles of impact which occur on its internal wall surface(s).
5. It provides a large flow area without any narrow passages.
6. It partially constitutes a combustion chamber, in which a good mixing between flue gas and air ensures that the intensity of combustion is maintained in the bed 2.
7. The physical dimensions of each cap 4 are chosen so that the fluidization rate in the bed material 8 is approximately doubled in the regions where the gas leaves the underside of the cap, which increases the mixing at the bottom of the bed 2 and thus increases the intensity of combustion therein.
8. The shape and volume of each cap 4 serve as a filling and supporting body for the bed material 8, which gives a lower pressure drop in the bed 2 as a function of the bed depth, which also improves the fluidization particularly in the case where the boiler is operating on a partial load.

Figure 3A:
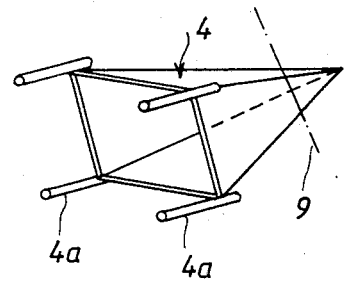
FIGS. 3a, 3b and 3c show three embodiments of a nozzle cap.
Figure 3B:
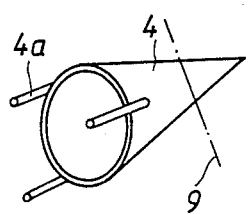
Figure 3C:
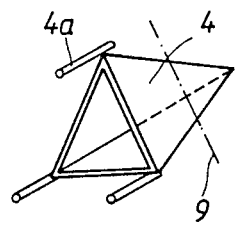

FIGS. 3a to 3c show three examples of suitable nozzle caps 4. FIG. 3a shows the cap 4 in the form of a pyramid with square cross-section and provided with four legs 4a by which the cap is supported over the respective nozzle. As previously mentioned, the cap could be conical (see FIG. 3b) or pyramidal with triangular (see FIG. 3c), rectangular or other polygonal section and truncated pyramids and cones (i.e. cut on the chain lines 9 in FIG. 3) may be used. Each nozzle 6 with its cap 4 should be shaped in such a way as to prevent clogging and to capture a floating gas cushion above the end 3 of nozzle tube 6.

The specific form of nozzle cap described above may be varied in many ways within the scope of the following claims.

What is claimed is:

1. In a boiler having at least a post-combustion fluidized bed and an underlying combustion fluidized bed wherein flue gases from said underlying bed enter said post-combustion bed via a plurality of gas inlet nozzles and fluidize particulate bed material in said post-combustion bed, said post-combustion bed including a floor defined by a pair of spaced apart plates defining a plenum space therebetween, gas tubes extending through said plates and said nozzles being located at the ends of said tubes, said gas tubes each having at least one hole communicating with said plenum space, means connected to said plenum space for supplying surges of pressurized gas to said nozzles through each said hole of said gas tubes for periodically cleaning said nozzles of any impurity deposits which could block the flow of flue gases therethrough, a nozzle cap overlying each of said nozzles and being embedded in said bed material in said post-combustion bed, each said nozzle cap comprising a deflecting member for guiding the flue gases laterally into the particulate bed material, each of said tubes comprising an open ended injection tube with said nozzle thereof being small in relation to the lower area of said overlying nozzle cap, each said cap having upwardly converging walls, each said wall forming a steep angle between 10° and 30° with the axis of the respective inlet nozzle, each said cap having a lower end lying below the respective inlet nozzle, and each said cap providing a cap space about the open end of the respective tube, which cap space is traversed by the flue gases passing through the tubes, and said cap space having such a volume as to form a dust-gas cushion between said cap and said open end, whereby the steep angle of each said wall of the respective cap presents steep angles of impact of the flue gases against the internal surface of each said wall to thereby avoid cap erosion, said steep angles avoid the tendency of the particulate bed material to adhere to the outer surfaces of said walls, the cushion serving as a buffer to deflect the incoming flue gases to thereby avoid clogging or adherence of dust to the respective cap, and said walls at said steep angle presenting large surfaces to said bed material to be thereby cooled during fluidization of said bed material.

2. In the boiler according to claim 1, wherein each said cap is in the shape of one of a cone, a truncated cone, a pyramid and a truncated pyramid.

3. In the boiler according to claim 1, wherein the transverse cross-section of each said cap is one of a triangle, a square, a rectangle and a polygon.

* * * * *